(12) United States Patent
Abbas et al.

(10) Patent No.: US 8,790,539 B2
(45) Date of Patent: Jul. 29, 2014

(54) AZEOTROPE-LIKE COMPOSITION OF 1,1,1,2,2,3,3-HEPTAFLUORO-3-METHOXY PROPANE AND 1-CHLORO-3,3,3-TRIFLUOROPROPENE

(75) Inventors: Laurent Abbas, Narberth, PA (US); Brett L. Van Horn, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 13/237,024

(22) Filed: Sep. 20, 2011

(65) Prior Publication Data

US 2012/0007016 A1 Jan. 12, 2012

Related U.S. Application Data

(63) Continuation-in-part of application No. 12/667,136, filed as application No. PCT/US2009/036268 on Mar. 6, 2009, now Pat. No. 8,703,690.

(60) Provisional application No. 61/034,513, filed on Mar. 7, 2008.

(51) Int. Cl.
*C09K 5/04* (2006.01)
*C09K 3/30* (2006.01)

(52) U.S. Cl.
CPC . *C09K 5/045* (2013.01); *C09K 3/30* (2013.01); *F25B 2400/18* (2013.01); *C09K 2205/32* (2013.01); *C09K 2205/122* (2013.01); *C09K 2205/112* (2013.01)

USPC .................. 252/68; 252/67; 222/635; 521/99

(58) Field of Classification Search
USPC .......................... 252/67, 68; 222/635; 521/99
See application file for complete search history.

(56) References Cited

U.S. PATENT DOCUMENTS

| | | | |
|---|---|---|---|
| 3,085,065 A | 4/1963 | Kvalnes | |
| 7,935,268 B2 | 5/2011 | Basu et al. | |
| 2005/0151110 A1 | 7/2005 | Minor et al. | |
| 2010/0326095 A1 | 12/2010 | Van Horn et al. | |
| 2011/0001080 A1 | 1/2011 | Van Horn et al. | |
| 2011/0012052 A1 | 1/2011 | Van Horn et al. | |
| 2012/0007016 A1 | 1/2012 | Abbas | |
| 2012/0128964 A1 | 5/2012 | Hulse et al. | |
| 2012/0172476 A1* | 7/2012 | Costa et al. | 521/170 |
| 2012/0202904 A1* | 8/2012 | Chen et al. | 521/131 |

OTHER PUBLICATIONS

M. S. Kim et al., "A Study to Determine the Existence of an Azeotropic R-22 'Drop-In' Substitute", NISTIR 5784, US Department of Commerce, Mar. 1996.*
The Behavior of a Near-Azeotropic Refrigerant Mixture of R-32/R-125 in an Enhanced Tube., K. A. Sweeney and J. C. Chato., ACRC RT-94., Apr. 1996 pp. 1-17.

* cited by examiner

*Primary Examiner* — John Hardee
(74) *Attorney, Agent, or Firm* — Steven D. Boyd

(57) ABSTRACT

Provided are azeotrope-like compositions comprising 1,1,1,2,2,3,3-heptafluoro-3-methoxy propane and E-1-chloro-3,3,3-trifluoropropene (K-1233zd) and uses thereof, including use in refrigerant compositions, refrigeration systems, blowing agent compositions, solvent, and aerosol propellants.

14 Claims, 1 Drawing Sheet

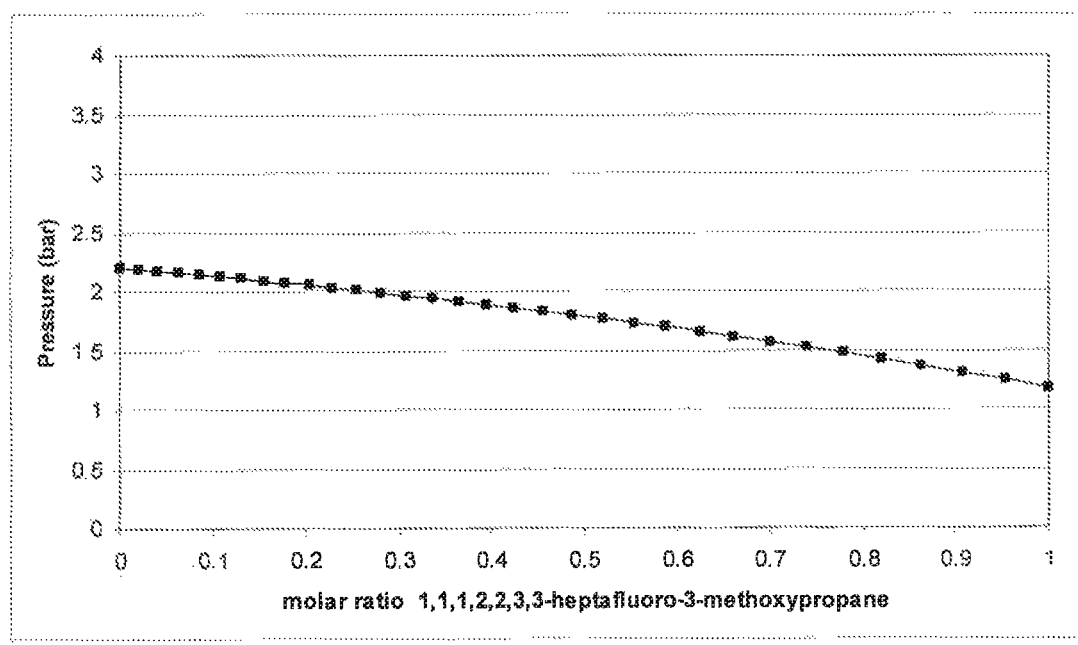

ion of U.S. patent application Ser. No. 12/667,136, filed Dec.
AZEOTROPE-LIKE COMPOSITION OF 1,1,1,2,2,3,3-HEPTAFLUORO-3-METHOXY PROPANE AND 1-CHLORO-3,3,3-TRIFLUOROPROPENE The present application is a continuation-in-part application of U.S. patent application Ser. No. 12/667,136, filed Dec. 29, 2009, now U.S. Pat. No. 8,703,690 which claims priority to PCT application serial number PCT/US09/36268 filed Mar. 6, 2009 which claims priority to U.S. provisional patent application Ser. No. 61/034,513 filed Mar. 7, 2008.

FIELD OF INVENTION

The present invention relates to azeotrope-like compositions of 1,1,1,2,2,3,3-heptafluoro-3-methoxypropane and E-1-chloro-3,3,3-trifluoropropene (E-1233zd) and uses thereof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential. Additionally, the use of single component fluids or azeotropic mixtures, which do not fractionate on boiling and evaporation, is desirable. However, the identification of new, environmentally safe, non-fractionating mixtures is complicated due to the fact that azeotrope formation is not readily predictable.

The industry is continually seeking new fluorocarbon based mixtures that offer alternatives, and are considered environmentally safer substitutes for CFCs and HCFCs.

The Montreal Protocol for the protection of the ozone layer, signed in October 1987, mandate the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change, signed in 1998. The emerging replacement materials, hydrofluoropropenes, were shown to be environmentally acceptable ie has zero ozone depletion potential (ODP) and acceptable low GWP.

Currently proposed replacement refrigerants for hydrofluorocarbons such as HFC-134a include HFC-152a, pure hydrocarbons such as butane or propane, or "natural" refrigerants such as $CO_2$. Many of these suggested replacements are, flammable, and/or have low energy efficiency. Therefore, new alternative refrigerants are being sought. Fluoroolefin materials such as hydrofluoropropenes and/or hydrochlorofluoropropenes have generated interest as replacements for HFCs.

The object of the present invention is to provide novel compositions that can serve as refrigerants, heat transfer fluids, blowing agents, solvents, de-fluxing agents, degreasers, aerosols, etc. that provide unique characteristics to meet the demands of low or zero ozone depletion potential and lower global warming potential as compared to the current HFCs.

BRIEF DESCRIPTION OF THE DRAWINGS

FIG. 1 is graph of Pressure (bar) versus molar ratio of 1,1,1,2,2,3,3-heptafluoro-3-methoxypropane,

DESCRIPTION OF PREFERRED EMBODIMENTS

The present inventors have developed several compositions that help to satisfy the continuing need for alternatives to CFCs and HCFCs. According to certain embodiments, the present invention provides azeotrope-like compositions comprising 1,1,1,2,2,3,3-heptafluoro-3-methoxypropane with E-1-chloro-3,3,3-trifluoropropene (E-1233zd).

The preferred compositions of the invention tend both to be non-flammable and/or exhibit relatively low global warming potentials ("GWPs"). Accordingly, applicants have recognized that such compositions can be used to great advantage in a number of applications, including as replacements for CFCs, HCFCs, and HFCs (such as HCFC123, HFC134a, HFC 245th, HFC 365mfc etc) in refrigerant, aerosol, and other applications.

Additionally, applicants have recognized surprisingly that azeotrope-like compositions of 1,1,1,2,2,3,3-heptafluoro-3-methoxypropane with E-1-chloro-3,3,3-trifluoropropene (E-1233zd) can be formed. Accordingly, in other embodiments, the present invention provides methods of producing an azeotrope-like composition comprising combining 1,1,1,2,2,3,3-heptafluoro-3-methoxypropane with E-1-chloro-3,3,3-trifluoropropene (E-1233zd) in amounts effective to produce an azeotrope-like composition.

In addition, applicants have recognized that the azeotrope-like compositions of the present invention exhibit properties that make them advantageous for use as, or in, refrigerant compositions and in foam blowing agents. Accordingly, in yet other embodiments, the present invention provides refrigerant compositions and/or flowing blowing agents, and solvents comprising an azeotrope-like composition of 1,1,1,2,2,3,3-heptafluoro-3-methoxypropane with E-1-chloro-3,3,3-trifluoropropene (E-1233zd).

Azeotrope-Like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant boiling and cannot be separated daring a phase change.

The azeotrope-like compositions of the present invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components, if the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure, it follows that, for azeotrope-like compositions, there is a range of compositions containing the same components in varying proportions that are azeotrope-like. All such compositions are intended to be covered by the term azeotrope-like as used herein.

It is well recognized in the art that it is not possible to predict the formation of azeotropes. Applicants have discovered unexpectedly that 1,1,1,2,2,3,3-heptafluoro-3-methoxypropane with E-1-chloro-3,3,3-trifluoropropene (E-1233zd) form azeotrope-like compositions.

According to certain preferred embodiments, the azeotrope-like compositions of the present invention comprise, and preferably consist essentially of, effective azeotrope-like amounts of 1,1,1,2,2,3,3-heptafluoro-3-methoxypropane and E-1-chloro-3,3,3-trifluoropropene (E-1233zd). The term "effective azeotrope-like amounts" as used herein refers to the amount of each component which upon combination with the other component, results in the formation of an azeotrope-like composition of the present invention. Preferably, the present azeotrope-like compositions comprise, and preferably consist essentially of, from about 99 to about 1 weight percent 1,1,1,2,2,3,3-heptafluoro-3-methoxypropane and from about 1 to about 99 weight percent of E-1-chloro-3,3, 3-trifluoropropene (E-1233zd). More preferably, the azeotrope-like compositions comprise, and preferably consist essentially of, from about 85 to about 10 weight percent 1,1,1,2,2,3,3-heptafluoro-3- and from about 15 to about 90 weight percent of -1-chloro-3,3,3-trifluoropropene (E-1233zd). Even more preferably, the azeotrope-like compositions comprise, and preferably consist essentially of, from about 75 to about 20 weight percent 1,1,1,2,2,3,3-heptafluoro-3- and from about 25 to about 80 weight percent of E-1-chloro-3,3,3-trifluoropropene (E-1233zd). Unless otherwise indicated, the weight percents disclosed herein are based on the total weight of 1,1,1,2,2,3,3-heptafluoro-3-methoxypropane and E-1-chloro-3,3,3-trifluoropropene (E-1233zd) in a composition.

The azeotrope-like compositions described herein preferably have a boiling point of from about 10° C. to about 34° C. at a pressure of about 1.013 bar. In certain more preferred embodiments, the present azeotrope-like compositions have a boiling point of from about 12° C. to about 28° C. at a pressure of about 1.013 bar and more preferably boiling point of from about 14° C. to about 26° C. at a pressure of about 1.013 bar.

The azeotrope-like compositions of the present invention can be produced by combining effective azeotrope-like amounts of 1,1,1,2,2,3,3-heptafluoro-3-methoxypropane and E-1-chloro-3,3,3-trifluoropropene (E-1233zd). Any of a wide variety of methods known in the art for combining two or more components to form a composition can be adapted for use in the present methods to produce an azeotrope-like composition. For example, 1,1,1,2,2,3,3-heptafluoro-3-methoxypropane and E-1-chloro-3,3,3-trifluoropropene (E-1233zd) can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

Composition Additives

The azeotrope-like compositions of the present invention may further include any of a variety of optional additives including stabilizers, metal passivators, corrosion inhibitors, and the like.

In certain preferred embodiments, the compositions of the present invention further comprise a lubricant. Any of a variety of conventional lubricants may be used in the compositions of the present invention. An important requirement for the lubricant is that, when in use in a refrigerant system, there must be sufficient lubricant returning to the compressor of the system such that the compressor is lubricated. Thus, suitability of a lubricant for any given system is determined partly by the refrigerant/lubricant characteristics and partly by the characteristics of the system in which it is intended to be used. Examples of suitable lubricants include mineral oil, alkyl benzenes, polyol esters, including polyalkylene glycols, PAG oil, and the like. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate which is available as Emery 2917 (registered trademark) and Hatcol 2370 (registered trademark). Other useful esters include phosphate esters, dibasic acid esters, and fluoroesters. Preferred lubricants include polyalkylene glycols and esters. Certain more preferred lubricants include polyalkylene glycols.

Uses of the Compositions

The present compositions have utility in a wide range of applications. For example, one embodiment of the present invention relates to refrigerant compositions comprising the present azeotrope-like compositions.

The refrigerant compositions of the present invention may be used in any of a wide variety of refrigeration systems including air-conditioning, refrigeration, heat-pump, chiller, heat engines, high temperature heat pumps, HVAC systems, and the like. Vapor-compression refrigeration, air-conditioning, or heat pump systems typically include an evaporator, a compressor, a condenser, and an expansion device. A vapor-compression cycle re-uses refrigerant in multiple steps producing a cooling effect in one step and a heating effect in a different step. A typical cycle can be described simply as follows: liquid refrigerant enters an evaporator through an expansion device, and the liquid refrigerant boils in the evaporator at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle. A heat pump is a device typically used to move heat from one source (a "source") to another (a "sink"); a reversible heat pump can be used to heat or cool, depending upon operation. In HVACR operations, a heat pump is typically a vapor-compression refrigerating device that includes a reversing valve to reverse the direction of heat flow, Heat engines, such as Rankine Cycles and Organic Rankine Cycles, are typically used to convert heat energy into mechanical work, particularly for power generation.

In certain preferred embodiments, the compositions of the present invention are used in refrigeration systems originally designed for use with an HCFC refrigerant, such as, for example, HCFC123. The preferred compositions of the present invention tend to exhibit many of the desirable characteristics of HCFC123 and other HFC refrigerants, including a GWP that is as low, or lower than that of conventional HFC refrigerants and a capacity that is as high or higher than such refrigerants, in addition, the relatively constant boiling nature of the compositions of the present invention makes them even more desirable than certain conventional HFCs for use as refrigerants in many applications.

In certain other preferred embodiments, the present compositions are used in refrigeration systems originally designed for use with a CFC-refrigerant. Preferred refrigeration compositions of the present invention may be used in refrigeration systems containing a lubricant used conventionally with CFC-refrigerants, such as mineral oils, silicone oils, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling an article according to the present invention comprise condensing a refrigerant composition comprising an azeotrope-like composition of the present invention and thereafter evaporating said refrigerant composition in the vicinity of the article to be cooled. Certain preferred methods for heating an article comprise condensing a refrigerant composition comprising an azeotrope-like composition of the present invention in the vicinity of the article to be heated and thereafter evaporating said refrigerant composition. In light of the disclosure herein, those of skill in the art will be readily able to heat and cool articles according to the present inventions without undue experimentation.

In another embodiment, the azeotrope-like compositions of this invention may be used as propellants in sprayable compositions, either alone or in combination with known propellants. The propellant composition comprises, more preferably consists essentially of and, even more preferably, consists of the azeotrope-like compositions of the invention. The active ingredient to be sprayed together with inert ingredients, solvents, and other materials may also be present in the sprayable mixture. Preferably, the sprayable composition is an aerosol. Suitable active materials to he sprayed include, without limitation, cosmetic materials such as deodorants, perfumes, hair sprays, cleansers, and polishing agents as well as medicinal materials such as anti-asthma and anti-halitosis medications.

Yet another embodiment of the present invention relates to a blowing agent comprising one or more azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. Any of the methods well known in the art, may be used or adapted for use in accordance with the foam embodiments of the present invention.

Another embodiment of this invention relates to a process for preparing a thinned thermoplastic product is as follows: Prepare a foamable polymer composition by blending together components comprising foamable polymer composition in any order. Typically, a foamable polymer composition is prepared by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin to or near to its glass transition temperature (Tg), or melt temperature (Tm) for crystalline polymers.

Other uses of the present azeotrope-like compositions include use as solvents, cleaning agents, and the like. Examples include vapor degreasing, precision cleaning, electronics cleaning, drying cleaning, solvent etching cleaning, carrier solvents for depositing lubricants and release agents, and other solvent or surface treatment. Those of skill in the art will be readily able to adapt the present compositions for use in such applications without undue experimentation.

EXAMPLES

The invention is further illustrated in the following examples which are intended to be illustrative, but not limiting in any manner.

Example 1

Vapor-liquid equilibrium measurements for a binary system of 1,1,1,2,2,3,3-heptafluoro-3-methoxypropane and E-1-chloro-3,3,3-trifluoropropene were taken in a vacuum cell equipped with a saphir tube is heated at 100° C. using an oil bath. Once temperature equilibrium was reached, the cell was charged with a known amount of E-1-chloro-3,3,3-trifluoropropene the product with the lowest boiling point, and the pressure at which equilibrium was reached was recorded. A known amount of 1,1,1,2,2,3,3-heptafluoro-3-methoxypropane was introduced in the cell and the content was mixed in order to accelerate equilibrium. At equilibrium, a very small quantity of a sample was taken from the gaseous phase as well as the liquid phase to be analysed by gas chromatography with thermal detector. FIG. 1 is a graph of pressure in bar versus the molar ratio of 1,1,1,2,2,3,3-heptafluoro-3-methoxypropane for a binary system of 1,1,1,2,2,3,3-heptafluoro-3-methoxypropane and E-1-chloro-3,3,3-trifluoropropene showing the azeotrope-like properties of the combination of the present invention.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

What is claimed is:

1. An azeotrope-like composition comprising effective amounts of 1,1,1,2,2,3,3-heptafluoro-3-methoxypropane and E-1-chloro-3,3,3-trifluoropropene (E-1233zd) having a boiling point of from about 10° C. to about 34° C. at a pressure of about 1.013 bar.

2. The azeotrope-like composition of claim 1 where the amount of 1,1,1,2,2,3,3-heptafluoro-3-methoxypropane is from about 99 to about 1 weight percent the amount of 1 E-1-chloro-3,3,3-trifluoropropene (E-1233zd) is from about 1 to about 99 weight percent of said composition.

3. The composition of claim 1 further comprising a lubricant.

4. The composition of claim 3 wherein said lubricant is selected from the group consisting of mineral oil, alkyl benzenes, polyol esters, polyalkylene glycols, polyvinyl ethers, polyalpha olefins, and combinations of two or more thereof.

5. A heat transfer composition comprising an azeotrope-like composition of claim 1.

6. A refrigeration, air conditioning, chilling, heat engines or heat pump system comprising a heat transfer composition of claim 5.

7. A method for cooling an article which comprises condensing a heat transfer composition of claim 5 and thereafter evaporating said refrigerant composition in the vicinity of the article to be cooled.

8. A method for heating an article which comprises condensing a heat transfer composition of claim 5 in the vicinity of the article to be heated and thereafter evaporating said refrigerant composition.

9. A sprayable composition comprising a material to be sprayed and a propellant comprising an azeotrope-like composition of claim 1.

10. A sprayable composition according to claim 9 wherein the sprayable composition is an aerosol.

11. A blowing agent comprising an azeotrope-like composition of claim 1.

12. A foamable pre-mix formulation comprising the blowing agent of claim 11 and a polyol.

13. A foamable pre-mix formulation of claim 12 further comprising at least one additive selected from the group consisting of surfactants, catalysts, compatibilizers, flame retardants, UV stabilizers, and mixtures thereof.

14. A solvent comprising an azeotrope-like composition of claim 1.

* * * * *